(12) United States Patent
Adams

(10) Patent No.: US 6,753,794 B1
(45) Date of Patent: Jun. 22, 2004

(54) CHARACTER ENTRY USING NUMERIC KEYPAD

(75) Inventor: Scott Adams, 3004 Deer Meadow Dr., Danville, CA (US) 94506

(73) Assignee: Scott Adams, Danville, CA (US)

( * ) Notice: Subject to any disclaimer, the term of this patent is extended or adjusted under 35 U.S.C. 154(b) by 491 days.

(21) Appl. No.: 09/858,699

(22) Filed: May 16, 2001

(51) Int. Cl.[7] .............................................. G08B 11/00
(52) U.S. Cl. .......................... 341/22; 341/23; 345/168; 379/368
(58) Field of Search .............................. 341/23, 22, 20, 341/21, 26, 156, 28; 345/168, 179, 171; 379/368

(56) References Cited

U.S. PATENT DOCUMENTS 4,443,789 A * 4/1984 Endfield et al. .............. 341/22

5,982,303 A * 11/1999 Smith .......................... 341/22

* cited by examiner

*Primary Examiner*—Michael Horabik
*Assistant Examiner*—Hung Dang
(74) *Attorney, Agent, or Firm*—Vierra Magen Marcus; Harmon & DeNiro LLP

(57) ABSTRACT

A system and method of keypad entries on a numeric keypad as letters of a Latin alphabet. In one aspect, the method comprises the steps of receiving at least one key entry within a fixed time period, the key entry corresponding to a letter character and being an association of a projection of the letter character on the keypad; and translating said key entry to a text character. The method may include receiving at least a first key entry and a second key entry wherein said first key entry represents a first point in a character, and said second key represents a second point in the character, the first and second points being chosen to represent points on a projection of the character on the keypad.

1 Claim, 2 Drawing Sheets

Figure 3

| | |
|---|---|
| a | 6,9 |
| b | 1,7 |
| c | 5,8 |
| d | 3,9 |
| e | 4,8 |
| f | 2,5 |
| g | 3,8 |
| h | 1,8 |
| i | 2,2 |
| j | 3,5 |
| k | 1,2 |
| l | 2,5 |
| m | 7,9 |
| n | 7,8 |
| o | 5,5 |
| p | 1,4 |
| q | 2,9 |
| r | 7,5 |
| s | 2,7 |
| t | 1,3 |
| u | 4,5 |
| v | 8,8 |
| w | 4,6 |
| x | 3,7 |
| y | 2,9 |
| z | 1,9 |

Figure 1

| 1 | ABC 2 | DEF 3 |
|---|---|---|
| GHI 4 | JKL 5 | MNO 6 |
| PQRS 7 | TUV 8 | WXYZ 9 |
| * | 0 | # |

CHARACTER ENTRY USING NUMERIC KEYPAD

BACKGROUND OF THE INVENTION

1. Field of the Invention

The present invention is directed to entry of alpha character text on a keypad, such as a standard numeric keypad.

2. Description of the Related Art

Advances in personal information technology have led to a proliferation of small electronic devices having ever-increasing data processing capabilities. One issue with these devices is that their small form factor leaves only limited area for data entry systems; the typical "qwerty" keyboard can only be shrunk so far before becoming problematic. In addition, users generally do not want full fledged "qwerty" keyboards on devices such as cellular phones, where the use of the keyboard may be limited to entering text on a one-time basis for electronic phone book entries.

Perhaps most common keypad in use in the world is the 12 key, 4 row ×3 three column numeric keypad. The keypad consists of the numerals one through zero as well as the asterisk (*) key and the number sign (#) key. The standard configuration is shown in FIG. 1. A number of various data entry schemes using this and other small keyboards have been developed.

In addition to the assignment of numerals to the keypad, keys 2–9 have letters assigned thereto to allow secondary functionality. Using these letter assignments, methods have been developed to allow individuals to enter text data using the limited number of keys on the keypad.

In one commonly used schemes, a user of the numeric keypad will enter text by selecting a particular key and the character interpreted as a result of the selection will depend on the number of times the user presses the key before the interpreter assumes the user is finished. For example, the user will depress the numeral one once to select a "a", twice to select the letter "b" and three times to select the letter "c". This particular method is illustrated the U.S. Pat. No. 5,392,338. Alternative methods of entry have been developed which map a sequence keys to a particular letter for data entry purposes. This is illustrated in the U.S. Pat. No. 6,184,803. However, in the method disclosed in the '803 patent, there is no intuitive relationship between the sequence selected and the letter which is entered into data.

Alternatives to using numeric keypads or other keyboard-type input systems have also been developed. Such systems generally comprise small, touch sensitive screens which include an interpretive mechanism to translate a user's touch input into text. One example is the well-known Graffiti® text entry systems and touch screens use by Palm, Inc. personal organizer devices. Unfortunately these non-keyed, text entry screens cannot be adapted to small devices such as telephones, or would be used so-infrequently as to make their inclusion in some devices, excessive.

In accordance with the invention, a unique method of interpreting keypad entry has been divided which allows a user to enter character text using a keypad, such as, for example, a numeric keypad, in an intuitive manner.

SUMMARY OF THE INVENTION

The present invention, roughly described, pertains to a method for entering text and a method and system for interpreting text entry based on a limited number of input keys selected by a user.

The method of interpreting keys includes interpreting a selection of at least one number on the numeric keypad as at least one of a first subset of letters after a fixed time, wherein said number represents a beginning point of a letter when the numeric keypad is viewed as a grid upon which the letter is written in standard handwritten minuscule form; and if a second number on the keypad is selected within said fixed time, interpreting the selection of said at least second number in combination with said first number as indicating one of a second set of letters, wherein said second number represents an end point of a letter when the numeric keypad is viewed as a projection of the letter on the keypad.

In a further aspect, the method comprises interpreting selections of items on a numeric keypad as alphabet text. The method may include the steps of receiving a selection of at least a first and a second keypad selections on the numeric keypad wherein said selections represents a point on a projection of a letter when the numeric keypad is viewed as a grid upon which the letter is written in standard handwritten minuscule form; and translating the selections into said letter.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which:

FIG. 1 depicts a two-dimensional conventional numeric keypad.

FIG. 3 depicts a table indicating the keypad mapping of 26 letters shown in FIG. 2 of the Latin alphabet to a numeric keypad in accordance with one aspect of the present invention.

DETAILED DESCRIPTION

Figure 2:
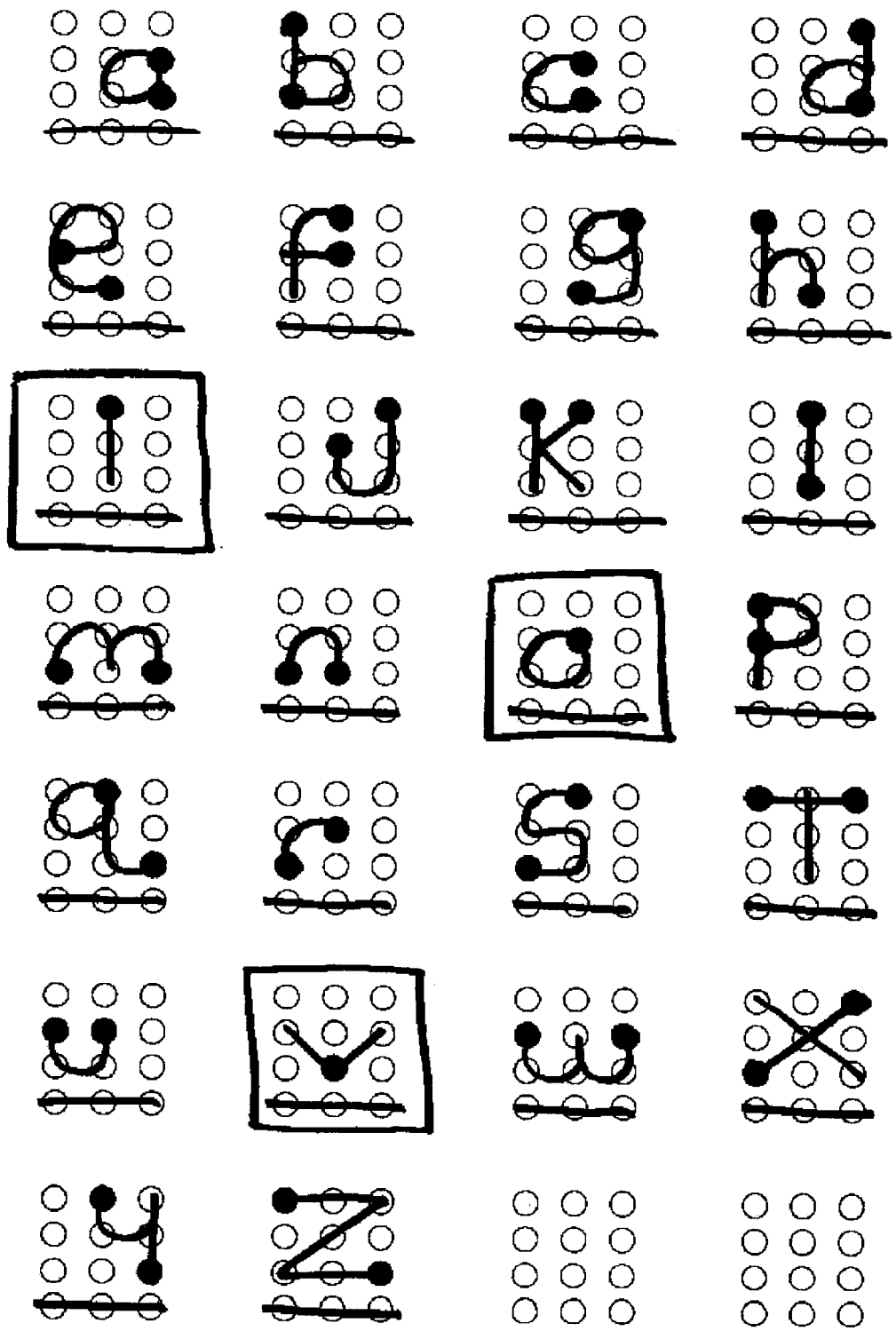
FIG. 2 depicts a key mapping for a method of interpreting text entry based on the input in numeric keypad FIG. 1.

The present invention provides a unique method for entering text on a numeric keypad, and a unique method for interpreting text as input based on the selection of keys on a numeric keypad or other limited keypad. It should be recognized that the invention is not limited to numeric keypads but may be applied to any keypad having a row-by-column organization with a sufficient number of rows and columns to enable the aspects of the invention described herein to be practiced.

It will be appreciated that the method of the invention is easily implemented in a device including a processor or other device capable of performing instructions programmatically, using any combination of hardware, software or the like. It will also be appreciated that the invention need not be automated, but could be performed by non-automated means. Nevertheless, the invention makes input of alpha characters using a numeric keypad, such as on a telephone, extremely intuitive for users, and is particularly advantageous in this application. One particular application for which the invention is particularly suited is telephones, such as cellular telephones, having electronic phone books requiring alphanumeric entries.

FIG. 2 shows a series of 26 letters and key combinations for entering the letter as text on a keypad. In accordance with the method, selection of a one or two key combination results in an interpretation of the combination as a text character. If a processing system is used to perform the method, selection of the keys shown in FIG. 2 in the sequence shown in FIG. 3 will be interpreted by the processing system and provided to an output device. The output device may be coupled to the input of, for example another system expecting a text character as input, such as an electronic phone book. In FIG. 2, the key entry pattern for each letter is represented on a 4×3 keypad, and it will be appreciated that this is equivalent to a numeric keypad such as that shown in FIG. 1. However, a 3×3 keypad will work as well as the 4×3 pad with the present invention.

In FIG. 2, all letters are entered by selecting at least one key, and in most cases two keys, to indicate the text input. In order to determine whether the person entering text intends to enter one or two keys, a fixed time period may be established to act as a benchmark. As such, if the user selects one key, a timer may then begin running to track the fixed time period. If the time period expires, it will be determined that the user intended to input only one key. If the user enters a second key before the expiration of the fixed time period, it will be determined that the user intended to input a two key combination and the number assigned to the combination recorded.

In an alternative embodiment of the invention, the user always selects two keys. In yet another embodiment, a timer need not be used, although some form of key entry reset is required.

A key aspect of the invention shown in FIG. 2 is the mapping of the keypad selection combinations to well-known hand-written miniscule forms of the characters. The term "miniscule" in calligraphy means the small, or lowercase, letter in most alphabets, in contrast to the "majuscule," or uppercase, capital letter. Unlike capitals, miniscule letters are not fully contained between two real or hypothetical lines; the stems of such ascending letters as b, d, f, h, k, and l range above the upper line, and such descending letters as p and q go below the lower. This mapping occurs by projecting the generally accepted hand-written form of the character onto the 3×3, 4×3 or other size grid utilized in accordance with the method. In the embodiment shown in FIG. 2, only a three by three section of the keypad is used. In this embodiment, the "*", "#" and "0" are not used in the key combinations. However, it should be recognized that the invention could be accomplished in alternative embodiments using all keys in the 4×3 matrix or eliminating a different row of the keypad, such as the numbers 1, 2, 3.

In the embodiment shown in FIG. 2, each character is mapped to a combination of keys. In the case of 23 of 26 characters, the keys in the combination are different. For three keys, a single key is used, and may be selected once or twice, in accordance with the various embodiments of the invention disclosed herein. Each character is recognized by the system in accordance with its key combination. The keys shown in FIG. 2 are memorable to the user as being a projection of a handwritten form of the miniscule Latin alphabet. Each of these letters is formed relative to the an x-height. As used herein the term "X-height" means the distance between the baseline and the midline of an alphabet, which is normally the approximate height of the un-extended lowercase letters—a, c, e, m, n, o, r, s, u, v, w, x, z —and of the torso of b, d, h, k, p, q, y.

In accordance with the intuitive mapping scheme of the invention, the three characters which are mapped to a single key of the keypad are the "i", "o" and "v". Each of these characters has a recognizable single point of the letter. In the case of the "i", it is the "dot" of the "i"; in the case of the "o", the start point of making the letter is the same as the end point, and in the case of the "v", it is the connection point of the two arms of the letter.

Each of the two different key combinations follows other conventions in accordance with the method of the invention in order to accomplish the intuitive mapping scheme. The three characters having only a single key associated with the letter are chosen such that each has an identifiable single characteristic.

In one such convention, the two character key combinations are mapped so that a projection of the letter onto the keypad is justified to either the left side (e.g. keys, 1, 4, 7, *) or the right side (e.g. keys 3, 6, 9, #) of the keypad based on the location of their stem, if present. In this manner, the key mappings for the letter "a" begins and ends on the right side of the keypad, while that for the letter "b" begins and ends on the left side of the keypad. As used herein the term "stem" means the main stroke that is more or less straight, not part of a bowl. For example, the letter o has no stem; the letter l consists of stem and serifs alone. As used herein the term "bowl" means the generally round or elliptical forms that are the basic body shape of letters such as C, G, O in the uppercase, and b, c, e, o, p in the lowercase.

In another such convention, the first and second keys of each key combination are intuitively placed in a vertical relationship to the grid as well. Accordingly, letters are projected based on their relation to the x-height as well. For example, all letters not having a stem do not use the top row of the matrix, with the exception of the letter "x".

A further convention of the projection scheme is that letters generally having no stem or bowl, but which are relatively centered, are projected and mapped so that a projection of the letter onto the keypad is justified in the center of the 3×3 matrix. Letters such as the center are generally wide letters m, t, w, x, and z.

This projection scheme applies to letters with apertures as well: narrower letters having an aperture are positioned so that an open row of keys of the matrix is adjacent to the aperture. This includes the letters c, e, n, s and u. With the letter c, for example, the open row is the 3, 6, 9 column; with the letter "u", it is the 1, 2, 3 row. (As used herein, the term "aperture" means the openings of letters such as C, c, S, s, a, u, n and e.)

Given the foregoing principles, a user attempting to input data will find the method easy to remember, due to the association of the keypad as a grid with the start and end points of the character. Since the user is likely generally familiar with in a handwritten format, a direct association can be made to entering the text on the keypad.

The specific key combinations in the embodiment of FIG. 2 when applied to a conventional numeric keypad are given in FIG. 3. It should be recognized that the association of the method to a typical keypad is not limited to numeric keypads. The invention could have further applicability with respect to assisting impaired individuals in entering text on a larger scale keypad. Moreover, combinations can be selected using characters outside the 3×3 matrix.

In yet another variation, the majorical letter set may be mapped to the keypad. In this variation, some form of shift switch is utilized, and may take the form of a one time, single character switch, or a permenant switch (functioning in a manner similar to a "Caps Lock" key on a computer keyboard. And in yet a further embodiment, non-Latin based alphabets may be input in a similar manner.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of interpreting the input of a 12 key numeric keypad as alphabet text, comprising:

assigning a set of key combinations comprising one or more keys to each letter in the alphabet wherein each set of keys comprises at least one and at most two keys, said keys being assigned to end points of a letter projected on the keypad such that:

letters having stems on the right side of a bowl are assigned a key combination based on a projection of the letter on the right side of the keypad;

letters having stems on the left side of a bowl are assigned a key combination based on a projection of the letter on the left side of the keypad;

letters having neither stems nor bowls are assigned a key combination based on a projection of the letter in the center of the keypad.

* * * * *